BINARY MAGNETIC RECORDING SYSTEM

Filed May 24, 1965

INVENTORS
RICHARD K. GERLACH
ROBERT A. MELNICK
NOBORU KIMURA

BY Louis A. Kline
John J. Matlago
Nathan Cass
THEIR ATTORNEYS

INVENTORS
RICHARD K. GERLACH
ROBERT A. MELNICK
NOBORU KIMURA

BY Louis A. Kline
John J. Matlago
Nathan Cass
THEIR ATTORNEYS

BINARY MAGNETIC RECORDING SYSTEM

INVENTORS
RICHARD K. GERLACH
ROBERT A. MELNICK
NOBORU KIMURA

BY Louis A. Kline
John T. Matlago
Nathan Cass
THEIR ATTORNEYS

INVENTORS
RICHARD K. GERLACH
ROBERT A. MELNICK
NOBORU KIMURA
BY Louis A. Kline
John T. Matlago
Nathan Cass
THEIR ATTORNEYS

BINARY MAGNETIC RECORDING SYSTEM

Filed May 24, 1965

INVENTORS
RICHARD K. GERLACH
ROBERT A. MELNICK
NOBORU KIMURA

BY Louis A. Kline
John T. Matlago
Nathan Cass
THEIR ATTORNEYS

INVENTORS
RICHARD K. GERLACH
ROBERT A. MELNICK
NOBORU KIMURA
Loris A Kline
BY John J. Matlago
Nathan Cass
THEIR ATTORNEYS INVENTORS
RICHARD K. GERLACH
ROBERT A. MELNICK
NOBORU KIMURA
Louis A. Kline
BY John J. Matlago
Nathan Cass
THEIR ATTORNEYS 3,423,744

BINARY MAGNETIC RECORDING SYSTEM

Richard K. Gerlach, Gardena, Robert A. Melnick, Los Angeles, and Noboru Kimura, Gardena, Calif., assignors to The National Cash Register Company, Dayton, Ohio, a corporation of Maryland Filed May 24, 1965, Ser. No. 458,344
U.S. Cl. 340—174.1 19 claims
Int. Cl. G11b 5/00

ABSTRACT OF THE DISCLOSURE

A magnetic recording system is provided for recording and reproducing self-clocked digital data in which the recorded data is preceded by an uninterrupted series of at least seven "1"–"0" alternations of binary digits ending with at least two like binary digits, and the data is followed by a unique all "0" bit character, a sum check character and a postamble of "1"–"0" alternations of binary digits. The "1"–"0" alternations of the preamble are used to provide detection and synchronization of clock signals during read-out, low frequency automatic gain control of the reading level and distinguishing of a recorded data track from noise in an unrecorded data track. The like (sync) binary digits indicate recorded data follows and provides for binary digit phase reversals to compensate for head winding polarity differences. The postamble "1"–"0" alternations prevents the system from detecting data as a sum check character since the alternations must be detected immediately after any sum check character.

This invention relates generally to means and methods for reading and writing data on a moving magnetic medium, and particularly in connection with the reading and writing of digital data on magnetic cards.

While magnetic cards are amenable to many of the techniques developed for magnetic tape recording, they present additional and more severe problems which must be solved if reliable operation with magnetic cards is to be achieved. For example, a card has portions at the ends thereof which are unstable for magnetic recording. Also, drop-outs are more likely with magnetic cards than with tape because of the difficulty of obtaining optimum transducing contact throughout the length of the card. Furthermore, variations from card to card and unit to unit are more pronounced with magnetic cards than with tape. Still further problems arise because of the individual nature of the magnetic cards and the greater difficulty in accessing, controlling and positioning the cards for reading and writing.

Accordingly, it is the broad object of this invention to provide improved means and methods for reading and writing on magnetic cards.

Another object of this invention is to provide an improved digital data recording and reproducing system for use with magnetic cards.

A further object of this invention is to provide a digital data recording and reproducing system for magnetic cards in which an improved format is provided for recording digital data on magnetic cards so as to permit more reliable reading thereof from card to card and from unit to unit.

Yet another object of this invention is to provide an improved preamble and postamble format for use in recording digital data on a magnetic card.

Still another object of this invention is to provide a digital data recording and reproducing system for use with magnetic cards in which an adjustable threshold is provided to increase the reliability of overall system operation.

A still further object of this invention is to provide a digital data recording and reproducing system having improved means for recording and recovering a sum check character.

An additional object of this invention is to provide improved automatic gain control (AGC) means for establishing a desired AGC level for recovery of magnetically recorded data on a magnetic card.

Another object of this invention is to provide a digital data recording and reproducing system for magnetic cards having improved means for detecting when a magnetic card has no information recorded thereon.

A further object of this invention is to provide a digital data recording and reproducing system for magnetic cards having improved means for correcting for phase reversals due to head winding polarity differences.

Another object of this invention is to provide a self-clocked digital data recording and reproducing system for magnetic cards in which improved means are provided for synchronization of the clock pulses generated during the recovery operation.

Still another object of this invention is to provide improved means for detecting and verifying when the end of a data record occurs.

The specific nature of the invention as well as other objects, advantages and uses thereof will become apparent from the following description taken in conjunction with the accompanying drawings in which.

Like numerals designate like elements throughout the figures of the drawings.

I. *General description*

Figure 1:
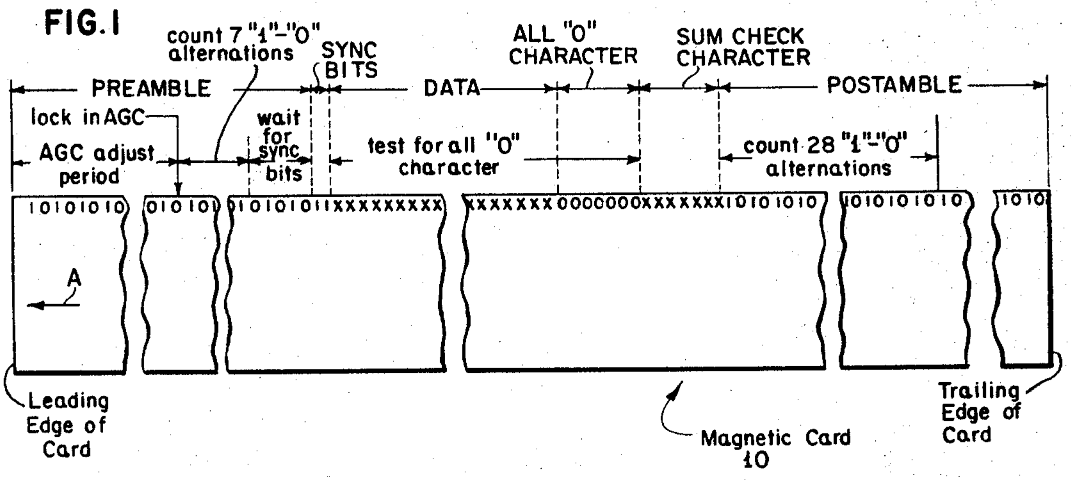
FIG. 1 is a schematic diagram illustrating a preferred binary recording format for a track of a magnetic card.

Referring to FIG. 1, a magnetic card 10 is shown illustrating a preferred serial binary digital recording format in accordance with the invention. The capitalized terms in FIG. 1 refer specifically to the recording format, while the lower case designations refer to operations performed during reading. Although the recording format for only a single channel or track is shown in FIG. 1, it will be understood that the other tracks (which may typically total 56) may have a similar format. Preferably, a Manchester type recording system is employed, but other self-clocked recording techniques may also be used.

Figure 2:
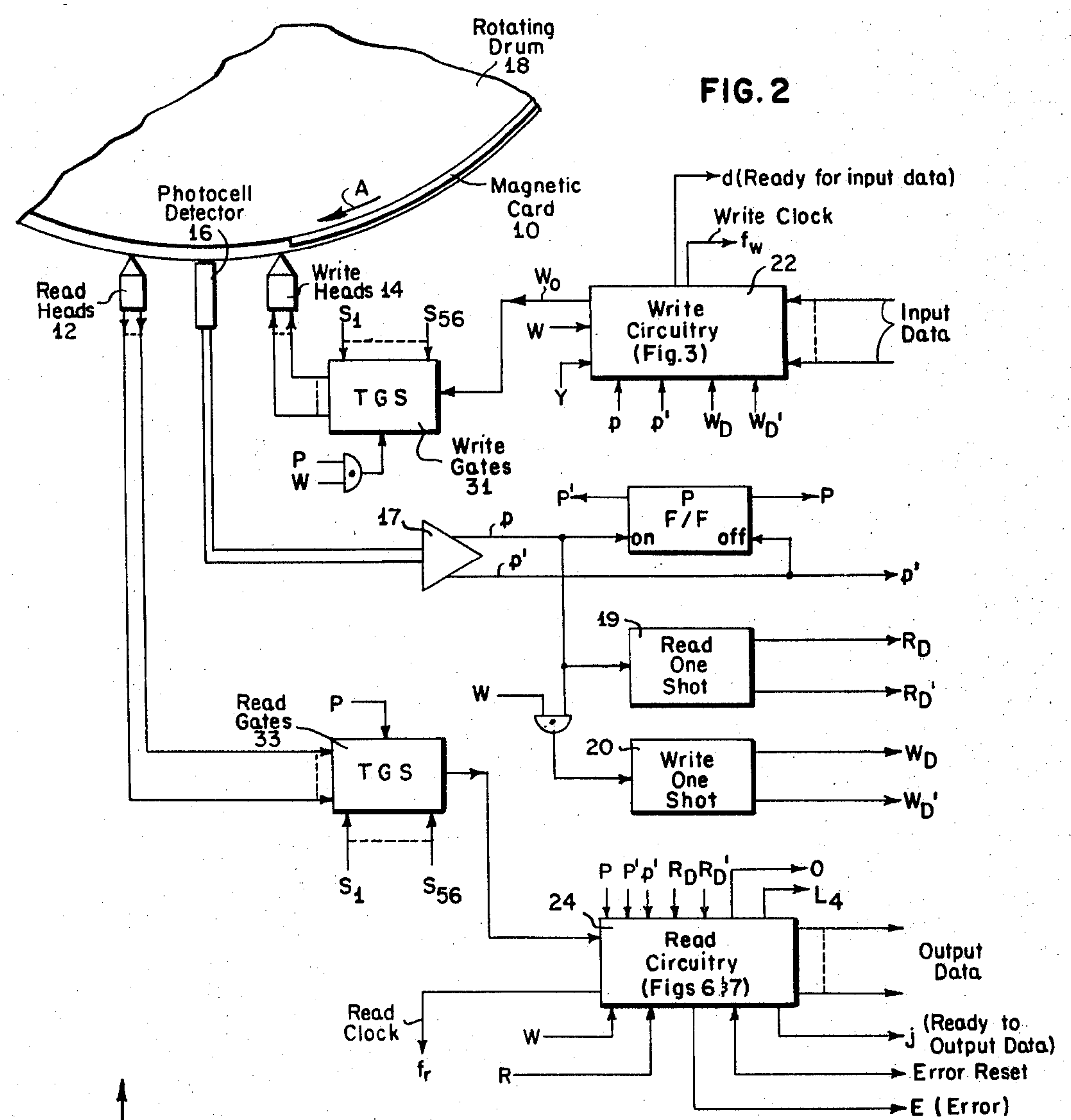
FIG. 2 is a block and schematic diagram broadly illustrating a magnetic card recording and reproducing system in accordance with the invention.

It will be assumed in FIG. 1 that the card 10 is moving in the direction indicated by the arrow A. As typically illustrated in FIG. 2, the card 10 may be carried to read and write heads 12 and 14 by a rotating vacuum drum 18 as, for example, is disclosed in the commonly assigned copending patent application, Ser. No. 12,032, filed Mar. 1, 1960. As also shown in FIG. 2, a photocell detector 16 is provided to detect the leading and trailing edges of the card. This is accomplished by feeding the output of the photocell detector 16 to an amplifier 17, which produces an output pulse *p* in response to detection of the leading edge of the card, and an output pulse *p'* in response to the trailing edge of the card. These leading and trailing edge pulses *p* and *p'* control the "on" state of a P flip-flop. The leading edge pulse *p* is also used to trigger read and write one-shots 19 and 20, the outputs of which are fed along with the output of the P flip-flop and the trailing edge signal *p'* to control the read and write circuitry 24 and 22.

The first portion of the card designated by the term "preamble" in FIG. 1 comprises an alternating "1"–"0" binary digital pattern which the selected write head begins to record in response to the leading edge pulse *p* in FIG. 2, and terminates when the write one-shot 20 times out. This preamble serves the following three functions during reading: (1) the alternating "1"–"0" preamble permits the system to conveniently recognize a blank or unrecorded card by requiring that an unintetrrupted consecutive string of seven "1"–"0" alternations be read before any reading of data on the selected track of the card can occur; (2) the alternating "1"–"0" preamble permits the system to properly detect and synchronize the reading clock signals derived from the Manchester recorded binary digits; and (3) the alternating "1"–"0" preamble permtis the system to establish a desired AGC reading level which is locked in when the read one-shot 19 in FIG. 2 times out. The preamble is made long enough to prevent any unstable portion following the leading edge of the card from interfering with system performance.

Following the preamble period in the illustrative track shown in FIG. 1 is a period designated as "sync bits" in which are recorded two consecutive binary "1's:" These sync bits serve two purposes during reading: (1) after proper detection of the preamble, the proper detection of the sync bits signals that the recorded data on the card is to follow thereafter, and (2) the sync bits permit the system to correct for binary digit signal phase reversals due to head winding polarity differences.

As shown in FIG. 1, the recorded data (indicated by "*x*" designations representing any desired combination of "1's" and "0's") follows immediately after the sync bits. The recorded data is then followed by an all "0" character (a character typically constitutes 7 bits) which is in turn followed by a sum check character, and then a postamble comprised of "1"–"0" alternations. This all "0" character is distinguishable from a data character, since all proper data characters will have at least one "1" digit as a result of the inclusion of an odd parity bit as one of its seven bits. The alternating "1"–"0" postamble is provided to prevent the system from recognizing a false sum check character (as might occur if a data character is incorrectly read as an all "0" character) by requiring that a consecutive string of typically twenty eight alternating "1"–"0's" (corresponding to four character periods) be detected following the sum check character.

With the above general description in view, an illustrative system mechanization will now be presented showing how reading and writing can be accomplished using the card format illustrated in FIG. 1. The illustrative mechanization will be presented in two parts. The first part will consider how recording operations are accomplished, and the second part will consider how reading operations are accomplished.

Before considering the reading and writing operations, some initial points concerning various conventions used in the drawings will be noted. First, it will be noted that in addition to the use of conventional electronic circuit block notations in the drawings, logical AND and OR gates are appropriately illustrated as semicircles, a "plus sign" in the semicircle indicating an OR gate and a "dot" in the semicircle indicating an AND gate. As is well known, an OR gate provides a true output when any of its inputs are true, while an AND gate provides a true output only when all of its inputs are true. When many related AND gates are involved, they are represented for the sake of simplicity as a single block designated as G, such as the gates 27 in FIG. 3. The enabling signal for each such block of AND gates is applied perpendicularly to the direction of data flow, as illustrated for example by the enabling signal Y applied to the gates 27 in FIG. 3. Where the block of gates serve to transmit a data waveform substantially unchanged, they are referred to as transmission gates, such as the read and write gates 33 and 31 in FIG. 2, and are represented by a block having the designation TGS.

Figure 3:
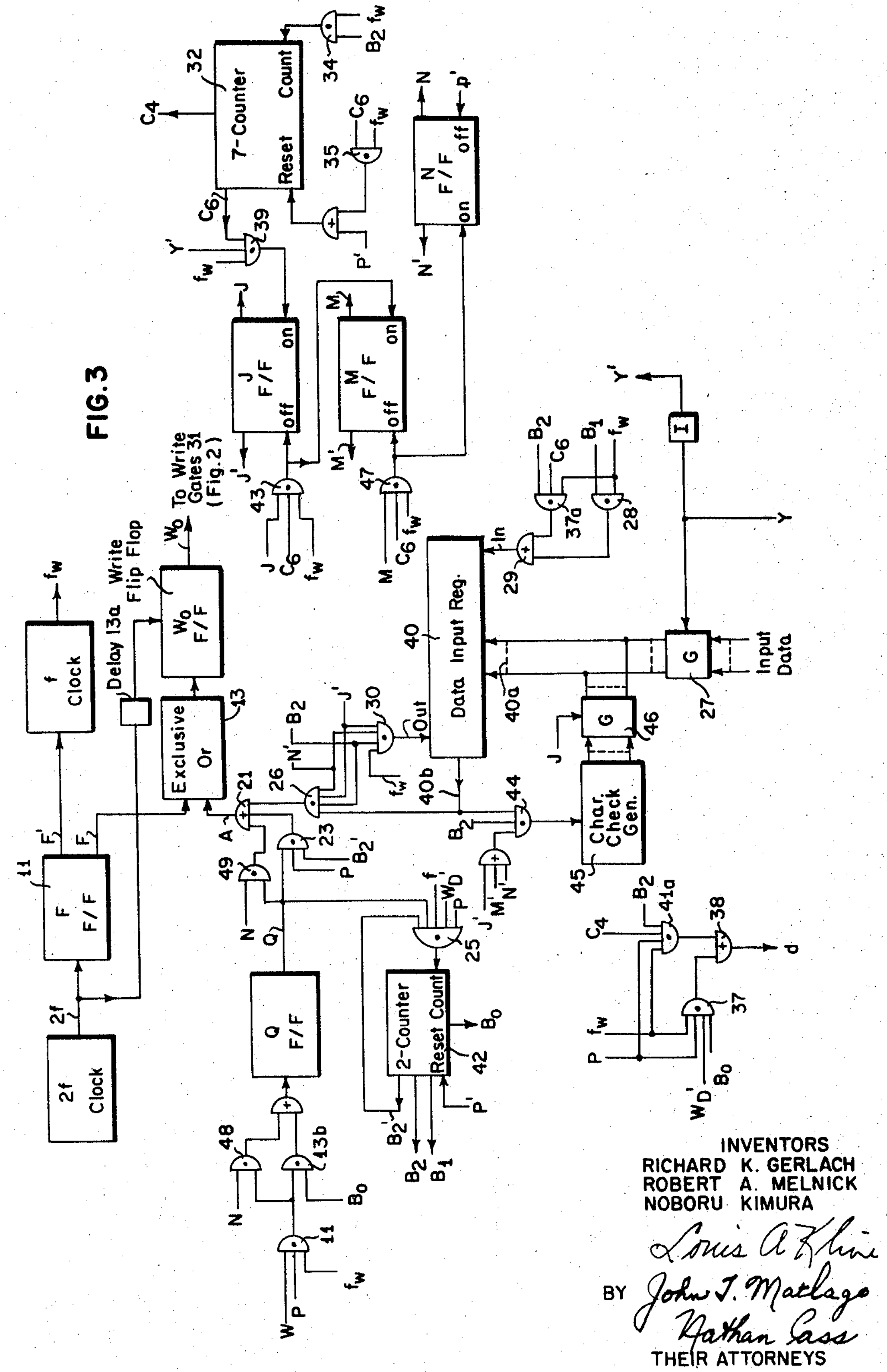
FIG. 3 is an electrical block and circuit diagram illustrating an embodiment of the write circuitry in FIG. 2.

Some further initial points will also be noted with regard to the operation of the various flip-flops and counters illustrated in FIGS. 2–9. There are three types of flip-flops illustrated. One type of flip-flop, such as the J flip-flop in FIG. 3, is illustrated as having "on" and "off" inputs and is turned "on" (or "true") when its "on" input receives a true signal, and is turned "off" (or "false") when its "off" input receives a true signal, the flip-flop remaining in the state to which it is switched until changed. The other type of flip-flop, such as the $W_0$ write flip-flop in FIG. 3, has only a single horizontally applied data input, the flip-flop responding to each vertically applied clock pulse to end up in either a "true" or "false" state in accordance with the horizontally applied data input signal. The third type of flip-flop, such as the F and Q flip-flops in FIG. 3, has only a single input on which it receives pulses, the flip-flop changing state in response to each input pulse so as to produce an alternating "1"–"0" output in response to the input pulses. All of these three types of flip-flops are illustrated in the drawings with either one or two outputs, an unprimed output (such as J in FIG. 3), being true when the flip-flop is "on" (or "true") and false when the flip-flop is "off" (or "false"). A primed output (such as J' in FIG. 3) is the inverse of the unprimed output—that is, the primed output is false when the flip-flop is "on" (or "true") and true when the flip-flop is "off" (or "false").

As to the counters, such as the 2-counter 42 in FIG. 3, each is constructed and arranged to count in response to each pulse applied to its "count" input, and to be reset to its initial count (designated by a zero subscript) in response to each pulse applied to its "reset" input, the counter remaining in its last count when reached until reset. The outputs of the counters, where shown, are given similar designations as those of the flip-flops, an unprimed counter output (such as $B_1$ in FIG. 3) being true when the counter resides in the count corresponding thereto, and false otherwise, and vice versa for a primed counter output (such as $B_0'$).

Another point to note at this time is that the flip-flops and counters are appropriately designed so as to prevent retriggering problems from arising, such as could happen when the input of a flip-flop or counter is dependent upon the state of its respective counter or flip-flop. One well known way of solving this problem is by incorporating an appropriate delay in the flip-flop inputs, or by making the counter or flip-flop responsive to the trailing edge of the input clock signal. Accordingly, it is to be understood during the description to follow that when an input signal is applied to a counter or flip-flop, the respective counter or flip-flop is designed to operate so that it remains unchanged for the short time necessary to prevent retriggering. Thus, although for the sake of simplicity, the various graphs which will be referred to during the description will show the counters and flip-flops changing at the leading edge of the clock pulse, it is to be understood that a short delay is in fact present which prevents the newly switched state of a flip-flop or counter output from being effective for logic until the next clock pulse. The only exception is with regard to binary signals applied to the $W_0$ flip-flop as will become evident when the derivation of the recording waveform is considered later on herein.

As a final point prior to the detailed description, it is to be understood that additional amplifiers and/or drivers besides those shown may be desired at various places in the circuits in order to provide a desired signal and/or power level. Such additional amplifiers and drivers are readily providable by those skilled in the art and where desirable may be considered as included within the block circuit representations shown.

II. *Recording operations*

As mentioned previously in the embodiment of the invention described herein, Manchester recording is used for recording binary data on the magnetic card. As is well known, Manchester recording provides at least one flux change per bit cell, the direction of flux switching in the middle of each cell corresponding to the binary digit being recorded. The $W_0$ graph in FIG. 4 (which is on the same sheet as FIG. 1) illustrates a typical Manchester recording waveform and corresponds to the output of the write flip-flop $W_0$ in FIG. 3, and also may be considered to correspond to the flux waveform of the selected write head which receives the output $W_0$ of the flip-flop $W_0$, via the particular one of the write gates 31 in FIG. 2, selected by the particular one of the track selection signals $S_1$ to $S_{56}$ which is true at that time. It will be noted that the write gates 31 are enabled only during a writing operation (when W is true) and only when the card covers the photocell detector 16 (when P is true).

The specific manner in which the write flip-flops $W_0$ is controlled to provide the desired Manchester recording waveform in accordance with the binary signals A to be recorded will now be explained. The binary signals A to be recorded appear at the output of OR gate 21 in FIG. 3 and from there are applied to the $W_0$ flip-flop via Exclusive OR gate 13 which also receives the F output of an F flip-flop. As illustrated by the F waveform in FIG. 4, the F flip-flop produces a square wave output in response to pulses produced by a $2f$ clock, the F signal being true for the first half of the bit cell period and false for the second half. Also, the F′ output of the F flip-flop is fed to an $f$ clock to produce the write clock pulses $f_w$ (FIG. 5) which are used as the write clock pulses $f_w$ for the write circuitry 22 (FIG. 2). The clock pulses for the $W_0$ flip-flop are obtained by applying the $2f$ pulses to the $W_0$ clock input via a short delay 13*a*; this delay is provided so as to permit the write flip-flop $W_0$ to respond to the logical products FA′, F′A of the A and F signals and the $2f$ clock pulses coupled thereto.

As will be understood from the graphs in FIG. 4, the end result of the logical combination of signals A and F by Exclusive Or gate 13 on the operation of the $W_0$ flip-flop to which the output of Exclusive Or gate 13 is applied is as follows: (1) when the binary signal A to be recorded is a "0," the $W_0$ flip-flop begins at the bit cell period in the false state and produces a positive-going flux change (according to the illustrative convention chosen) in the selected write head at the center of the bit cell period, and (2) when the binary signal A to be recorded is a "1," the $W_0$ flip-flop begins the bit cell period in the true state and produces a negative going flux change in the selected write head at the center of the bit cell period, the directions of switching being indicated in FIG. 4 by the arrows in the $W_0$ graph.

Having described how the Manchester recording waveform may typically be provided in response to the binary signals A appearing at the output of OR gate 21 in FIG. 3, it will next be described how the write circuitry 22 of FIG. 3 provides the recorded binary signals A in accordance with the track recording format illustrated in FIG. 1. For this purpose, reference will be made to the graphs of FIG. 5 which are arranged to correspond to the recording format shown in FIG. 1 for ready comparison therewith.

It will be remembered from FIG. 1 that recording on a track of the card begins with an alternating "1"–"0" preamble. This is accomplished by appropriate control of the Q flip-flop in FIG. 3. As soon as signal P becomes true (FIG. 5) in response to the leading edge of the card reaching the photocell detector 16 (FIG. 2), the Q flip-flop provides an alternating "1"–"0" output in response to clock pulses $f_w$ applied to its single input line via AND gates 11 and 13*b* (W being true during a writing operation and $B_0$ being true since the 2-counter 42 is in its initial count $B_0$). The output of the Q flip-flop is fed via AND gate 23 ($B_2'$ being true since 2-counter 42 is in its initial state $B_0$) and OR gate 21 to serve as the data A for the preamble period as illustrated in the respective A graph of FIG. 5.

Figure 5:
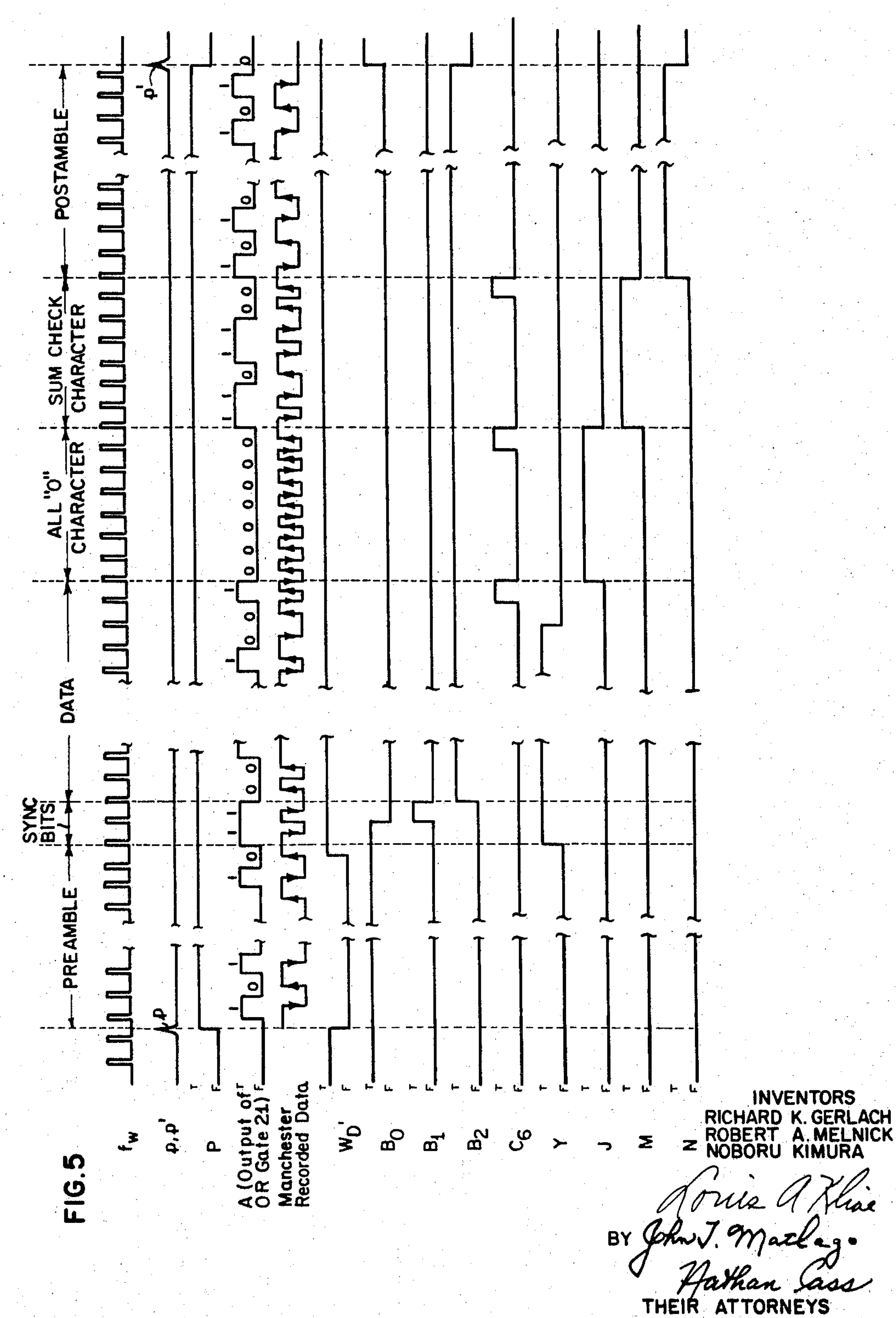
FIG. 5 is a series of timing graphs which will be used in explaining the operation of the write circuitry of FIG. 3.

The "1"–"0" alternations thus provided by the Q flip-flop continue until the write one-shot 20 (FIG. 2) times out, causing $W_D'$ to become true (FIG. 5) enabling AND gate 25 so as to cause the 2-counter 42 (FIG. 3) to force a double "1" output from the Q flip-flop to form the "1'—"1" sync bits. More specifically, and with reference to the respective graphs of FIG. 5, when the write one-shot 20 times out and $W_D'$ becomes true, the next "1" output from the Q flip-flop passes to the count input of the 2-counter 42 via AND gate 25 in FIG. 3, causing the 2-counter to leave its initial count $B_0$ (FIG. 5) and switch to its next count $B_1$. The first "1" output of the Q flip-flop after $W_D'$ becomes true serves as the first "1" sync bit. Since $B_0$ is now false, AND gate 13*b* is disabled so that the next clock pulse cannot reach the Q flip-flop, which will ten remain in its "1" state to provide a second "1" output which serves as the second sync bit, and which also passes via AND gate 25 to the count input of the 2-counter 42 to cause it to reach its final count $B_2$ (FIG. 5). Since $B_2'$ will then be false, AND gate 23 is disabled to disconnect the output of the Q flip-flop from OR gate 21 preparatory to the recording of the input data from a data source, which may typically be a data processor. The data processor may conveniently be signalled that the system is going to be ready for the input data by using the write one-shot signal $W_D'$ to enable an AND gaate 37 so as to permit the write clock $f_w$ to pass therethrough and through OR gate 38 to produce the ready for data signal *d* (FIGS. 2 and 3).

The input data is received one character at a time with each character constituting 7 bits, one bit being an odd parity bit. Each input data character is fed in parallel to a data input register 40 via AND gates 27 which are open as a result of signal Y from the data processor becoming true (for example, in response to the data processor receiving a true $W_D'$ signal). The data input register 40 has an "in" and an "out" control line, a 7-bit character being received in parallel on input lines 40*a* in response to a true signal applied to the register's "in" control line, and being shifted out in series on output line 40*b* in response to true signals being applied to the register's "out" control line.

The first true signal applied to the "in" control line of the data input register 40 occurs via AND gate 28 and OR gate 29 in FIG. 3 on the first clock signal $f_w$ occurring after count signal $B_1$ becomes true, causing the first input data character to be fed to the data input register 40 via AND gates 27. Then, when count signal $B_2$ becomes true (FIG. 5), AND gate 30 is enabled (since N and J are initially false) so that on the next following clock $f_w$, the first bit of the character fed into the data input register 40 is fed out via AND gate 26 (which is enabled since $B_2$, J′ and N′ are true) to OR gate 21 to form the first bit of the first character of input data, which in graph A of FIG. 5 is illustrated as "0."

During the next six clocks $f_w$, the remaining six bits of the first character in the data input register 40 will be shifted out and written on the card. The number of bits of the character shifted is counted by a 7-bit counter 32 which starts counting clocks $f_w$ when $B_2$ enables its count input AND gate 34 and is reset after the last bit of each character is counted as a result of count $C_6$ enabling the reset AND gate 35. Also, count signal $C_6$ is used along with count signal $B_2$ to enable AND gate 37*a* so as to cause each new character to be fed into the data input register 40 during count signal $C_6$. In order to signal the data processor (or other source supplying the input data) in advance of when the next character is required, the count signal $C_4$ may conveniently be used to enable an AND gate 41*a* so as to permit the write clock $f_w$ to pass through OR gate 38 to produce the ready for data signal *d*.

The input data continues to be fed into the data input register 40 and shifted out and recorded on the magnetic card as just described until the data processor signals the end of data by causing the signal Y to become false, which may typically occur in response to the first ready for data signal *d* occurring after the last character has been fed into the data input register 40. Since Y' will then be true at the next occurring count signal $C_6$, AND gate 39 will be enabled to permit the write clock pulse $f_w$ to pass therethrough to turn "on" the J flip-flop in FIG. 3 which results in the recording of the all "0" character immediately following the end of the data (FIGS. 1 and 5). This occurs because when signal J becomes true, AND gate 30 is disabled to prevent activation of the data input register "out" control line, whereby the output A of OR gate 21 remains false during the next seven counts to cause seven "0's" to be written, after which the clock pulse $f_w$ occurring at count $C_6$ passes through AND gate 43 to turn "off" the J flip-flop and turn "on" an M flip-flop, as illustrated by the respective J and M graphs in FIG. 5.

Also at count $C_6$ following the switching "on" of flip-flop J, the sum check character is transferred into the data input register 40 via AND gates 46, the sum check character having been generated by a character check generator 45 in response to the input data bits fed thereto from the data input register 40 via AND gate 44. Then, during the next seven clocks after the M flip-flop is "on," the seven sum check character bits are shifted out of the data input register 40 via AND gate 26 and OR gate 21 so as to be written on the card track (FIGS. 1 and 5) immediately following the sum check character, after which the clock pulse $f_w$ occurring at count $C_6$ passes through AND gate 47 to turn "off" the M flip-flop and turn "on" an N flip-flop, as illustrated by the respective M and N graphs in FIG. 5.

The turning "on" of the N flip-flop initiates the alternating "1"–"0" postamble period (FIGS. 1 and 5) by enabling AND gate 48 so as to permit the write clocks $f_w$ to again alternate the Q flip-flop whose output now passes via AND gate 49 to OR gate 21 to form the alternating "1"–"0" binary signals for the postamble period. Since the Q flip-flop was left in the "1" state after the sync bits, the postamble starts with a "1." The alternating "1"–"0" postamble continues until the trailing edge of the card (FIG. 1) passes the photocell detector 16, causing the trailing edge signal *p'* to be produced which turns "off" the N and P flip-flops, and resets the counters 32 and 42, terminating the writing operation.

III. *Reading operations*

Figure 8:
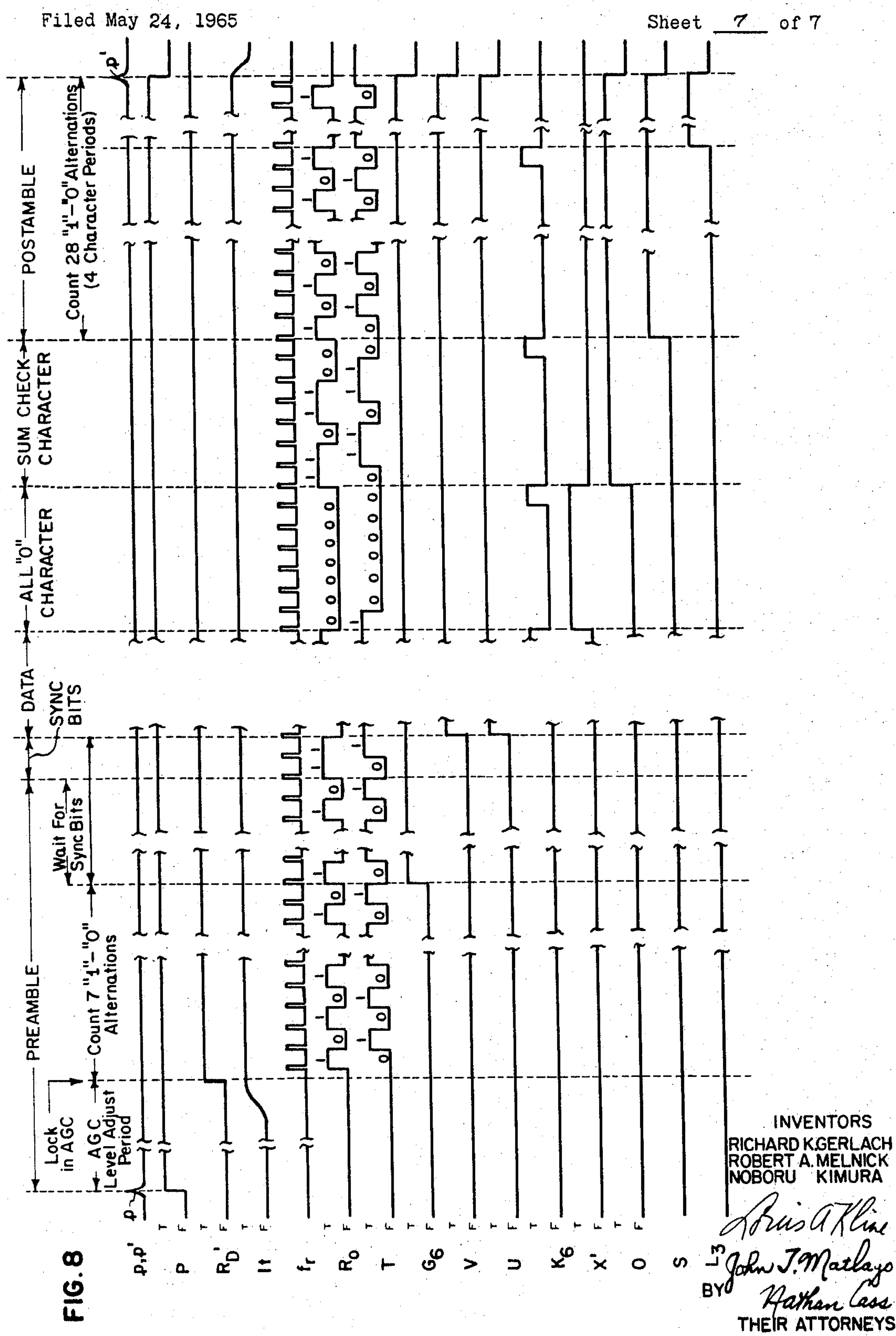
FIG. 8 is a series of timing graphs which will be used in explaining the operation of the read circuitry of FIGS. 6 and 7.

Like the writing operations, the reading operations are initiated when the leading edge of the card 10 (FIG. 2) reaches the photocell detector 16, causing the photocell amplifier 17 to produce the leading edge signal *p* which turns "on" the P flip-flop and triggers the read one-shot 19, as illustrated in FIG. 8.

It is to be understood that, as is conventional, reading occurs not only when reading of information from a card track is desired, but also occurs during writing to permit the equipment which is supplying the data (such as a data processor) to check the data read with that being written to make sure that the data has been accurately written on the card track. Since the reading portion of the exemplary system being described operates the same whether reading alone, or both writing and reading are taking place, no distinction therebetween will be made in the description of the reading operation, except with regard to threshold levels which are different for reading and writing.

Figure 6:
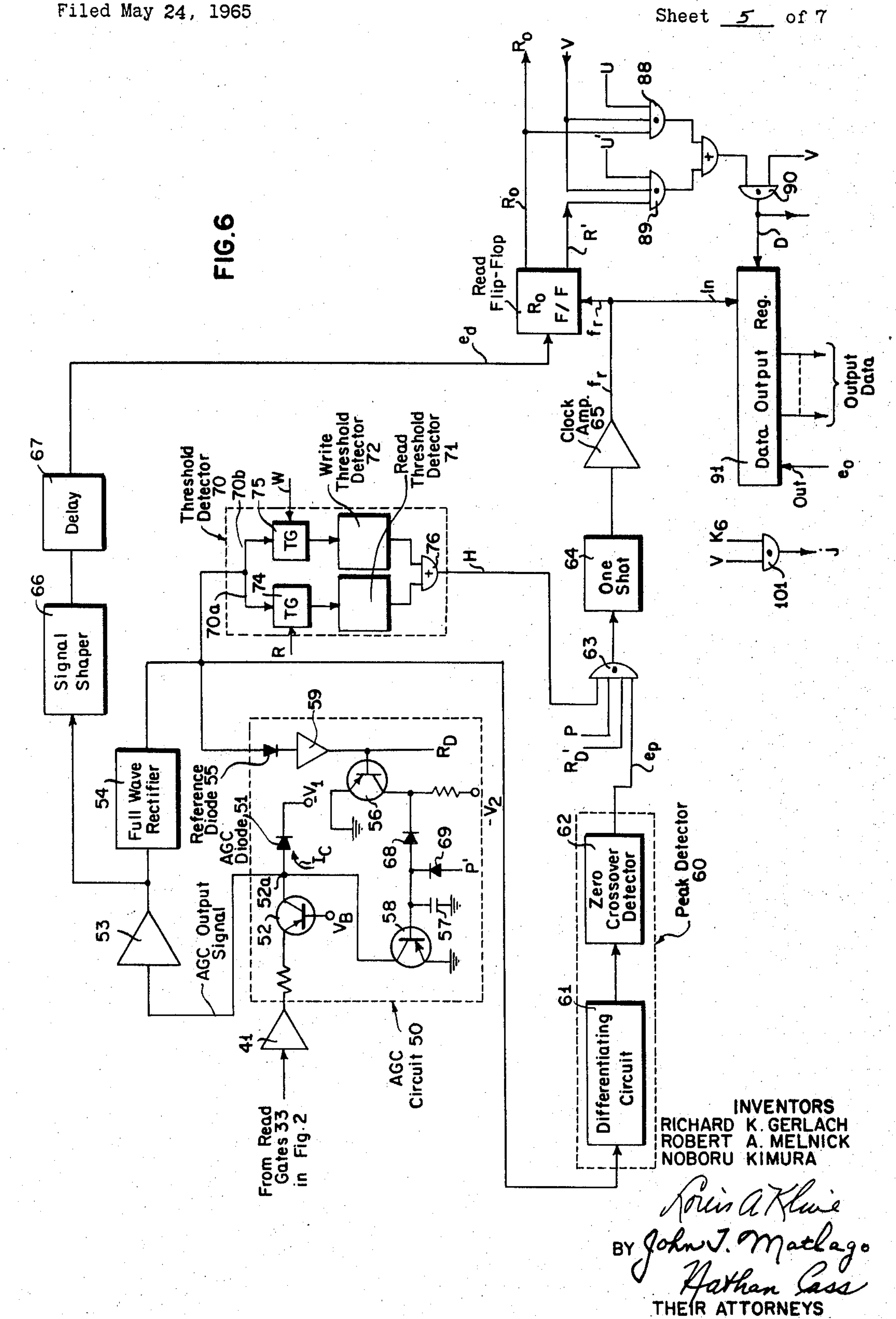
FIGS. 6 and 7 are electrical block and circuit diagrams illustrating an embodiment of the read circuitry of FIG. 2.

After flip-flop P turns "on," the reading operation is initiated and the alternating "1"–"0' preamble signals picked up by the selected read head are fed to an amplifier 41 in FIG. 6, via the particular one of the read gates 33 (FIG. 2) which is selected by a respective one of the track selection signals $S_1$ to $S_{56}$. The amplified output of amplifier 41 is fed to an AGC circuit 50 in FIG. 6 which serves to normalize the signal read from the card so as to mitigate against signal amplitude variations resulting from variations of parameters in the reading head and magnetic card. The specific manner in which this AGC circuit 50 establishes a desired AGC level and locks in this established level when the read one-shot 19 (FIG. 2) times out will now be explained with additional reference to FIG. 9.

Figure 9:
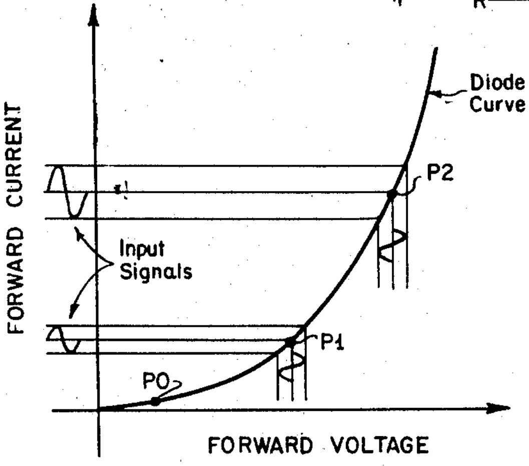
FIG. 9 is a graph showing the voltage vs. current characteristic of the AGC diode of the AGC circuit in FIG. 6 by means of which the AGC function is obtained.

Basically, the AGC circuit 50 operates to perform the AGC function by taking advantage of the non-linearity of the current vs. voltage characteristic of the AGC diode 51 in FIG. 6, a typical diode characteristic curve being illustrated in FIG. 9. It will be understood by considering FIG. 9 along with FIG. 6 that the detected signal appearing at junction 52*a* following transistor 52 of the AGC circuit 50 in FIG. 6, is dependent on the impedance of the AGC diode 51, which in turn is dependent on the D-C operating point thereof as determined by the D-C control current $I_c$ passing therethrough. Thus, by adjusting the D-C current $I_c$ flowing in the AGC diode 51 so that its D-C operating point is at point P0 in FIG. 9 with no input signal applied, and then causing the control current $I_c$ to vary so that the operating point moves along the curve of FIG. 9 as a function of the input signal strength, an essentially constant output signal will be obtained at junction 52*a*, as illustrated, for example, at points P1 and P2 in FIG. 9.

The resultant output at junction 52*a* is utilized in four ways: (1) output 52*a* is fed via amplifier 53 and full wave rectifier 54 to the AGC loop formed by reference diode 55, amplifier 59, transistor 56, integrating capacitor 57, and transistor 58 so as to generate the AGC diode control current $I_c$; (2) output 52*a* is fed via amplifier 53 and full wave rectifier 54 to a peak detector 60, whose output in turn is fed via AND gate 63 to a one-shot 64 and then to a clock amplifier 65 for derivation of the read clock $f_r$ from the detected Manchester signal; (3) output 52*a* is fed via amplifier 53 to a signal shaper 66 and then to a delay 67 to derive from the detected Manchester signal the data signals for feeding to the read flip-flop $R_o$; and (4) output 52*a* is fed via amplifier 53 and full wave rectifier 54 to a threshold detector 70 whose output in turn serves as an enabling signal for AND gate 63 in order to permit generation of read clocks only if the amplitude of the detected signal exceeds a predetermined threshold level, which is different for reading and writing, as will be explained later on herein.

Considering (1) above which concerns the generation of the control current $I_c$ for the AGC diode 51, it will be understood from FIG. 5 that the reference diode 55 is chosen to permit only the excess portion of the signal appearing at the output of the full wave rectifier 54 (that is, the portion of the signal which is greater than the desired normalized value) to pass through the reference diode 55 for amplification by amplifier 59. During the time that the read one-shot 19 (FIG. 2) is activated at the beginning of the preamble (FIGS. 1 and 5), the output signal $R_D$ therefrom is true to permit the amplified difference signal from amplifier 59 to pass through transistor 56 and diode 68 to charge capacitor 57, whose output in turn determines the AGC diode control current $I_c$ produced by transistor 58. Capacitor 57 starts charging from the same point each time a reading operation is initiated, since capacitor 57 is discharged to an initial value by applying the signal P' from the P flip-flop (FIG. 2) via diode 69 in FIG. 6.

Thus, during the initial preamble period when $R_D$ is true, transistor 56 will charge capacitor 57 from its initial value, causing the control current $I_c$ provided by transistor 58 to increase so as to cause the operating point of the AGC diode 51 to move progressively along the curve in FIG. 9 from its no input signal point P0 towards point P2 until the output voltage from the full wave rectifier 54 approaches the reference provided by reference diode 55, the "on" time of the read one-shot 19 (FIG. 2) being chosen long enough for this to occur. Then, when the read one-shot 19 times out, signal $R_D$ will become false to cause saturation of transistor 56, which will in turn cause diode 68 to be reverse biased so as to thereby lock in the voltage on capacitor 57. The control current $I_c$ for AGC diode 51 will thus be locked in at the value neccessary to give the desired normalized signal output from the AGC circuit during the remainder of the reading operation. The time constant of the circuit associated with capacitor 57 is chosen so that the locked-in voltage thereon does not change appreciably during the reading operation.

Figure 4:
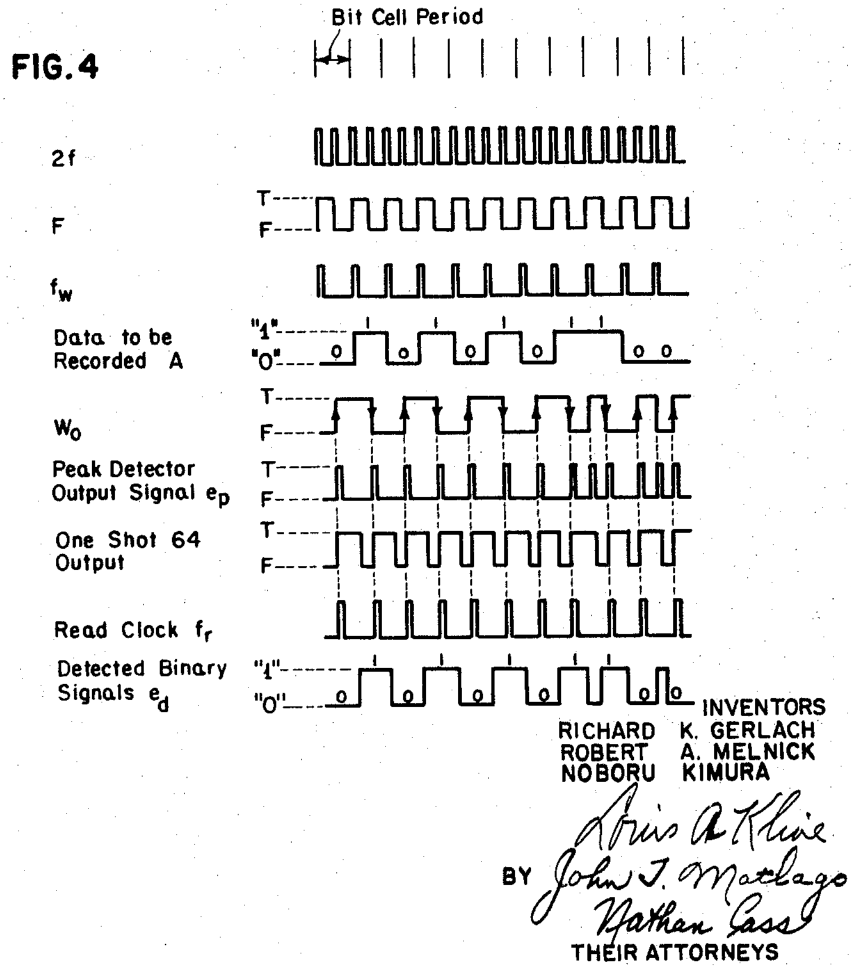
FIG. 4 is a series of timing graphs showing the waveforms of various pertinent signals during reading and writing.

Next considering (2) above concerning the derivation of the read clocks $f_r$ from the detected Manchester signal, it will be seen in FIG. 6 that the peak detector 60 to which the output of the full wave rectifier 54 is fed for this purpose comprises a differentiating circuit 61 and a zero crossover detector 62 which provide output pulses $e_p$ corresponding to every zero crossover of the Manchester recording waveform, as shown in the peak detector graph $e_p$ in FIG. 4. These peak detector output pulses $e_p$ are fed to one-shot 64 via AND gate 63. AND gate 63 is enabled only after the read one-shot 19 (FIG. 2) times out and only if the output H of the threshold detector 70 is true indicating that the detected signal is above a predetermined threshold level. As illustrated in the one-shot 64 output graph in FIG. 4, one-shot 64 is chosen to have an "on" time so as to bypass any $e_p$ pulses resulting from crossovers at the beginning of each bit cell period. As will be evident from FIG. 9, the alternating "1"–"0" preamble conveniently serves to synchronize the one-shot 64 to trigger in response to the proper $e_p$ pulses occurring in the middle of each bit cell period and to eliminate $e_p$ pulses occurring at the beginning of each bit cell period. As illustrated in FIG. 4, $e_p$ pulses do not occur at the beginning of a bit cell period until the "1"—"1" sync bits are read.

Next considering (3) above concerning the generation of the threshold signal H, it will be seen in FIG. 6 that the threshold detector 70 provides two alternate paths **70*a* and 70*b* for transmission of the output signal from the full wave rectifier 54. depending upon whether a reading operation or a writing operation is being performed. If a reading operation is being performed, signal R is true to cause the output of full wave rectifier 54 to pass to a read threshold detector 71 which provides a true output H via OR gate 76 only if the full wave rectifier output signal is above a predetermined read threshold level. On the other hand, if a writing operation is being performed, signal W is true to cause the output of full wave rectifier 54 to pass to a write threshold detector 72 which provides a true output H via OR gate 76** only if the full wave output signal is above a predetermined write threshold level. The write threshold level is made significantly greater than the read threshold level in order to permit more reliable system operation from unit to unit and from card to card, as well as to permit a reasonable range of system tolerances.

Now considering (4) above concerning the derivation of the binary recorded values from the detected Manchester signal. It will be understood from FIG. 6 that the output of amplifier 53 is fed to a signal shaper 66 which shapes the detected Manchester signal, and after being appropriately delayed by delay 67 (to compensate for delays in the clock derivation circuitry) appears as illustrated in the $e_d$ graph in FIG. 4 in which the read clocks $f_r$ occur in the center of the shaped binary output signals $e_d$. Thus, the read flip-flop $R_o$ in FIG. 6, in responding to the detected binary signals $e_d$ and the derived read clock pulses $f_r$, produces an output signal $R_o$, shown in FIG. 8, and an output signal $R_o'$ which is the inverse thereof.

Having explained how the read clock $f_r$ and the binary recorded signals $R_o$ from the read flip-flop $R_o$ are derived from the recorded Manchester waveform on the magnetic card, the manner in which the recorded data on the card is read in accordance with the recording format will next be considered. It will be remembered from the previous description (and as illustrated in FIGS. 1 and 8) that the first part of the alternating "1"—"0" preamble recorded on the card serves as an AGC level adjust period, the AGC level being locked in when the read on-shot 19 (FIG. 2) times out, causing $R_D'$ to become true. By design, the timing out of one-shot 19 is caused to occur prior to the reading of the sync bits. As mentioned previously, when on-shot 19 times out, AND gate 63 in FIG. 6 is enabled (assuming the signal amplitude is above the threshold level so that H is also true) permitting read clock signals $f_r$ to be generated to activate the read flip-flop $R_o$, which will then begin to alternate in accordance with the "1"–"0" preamble as shown in the $R_o$ graph in FIG. 8.

Figure 7:
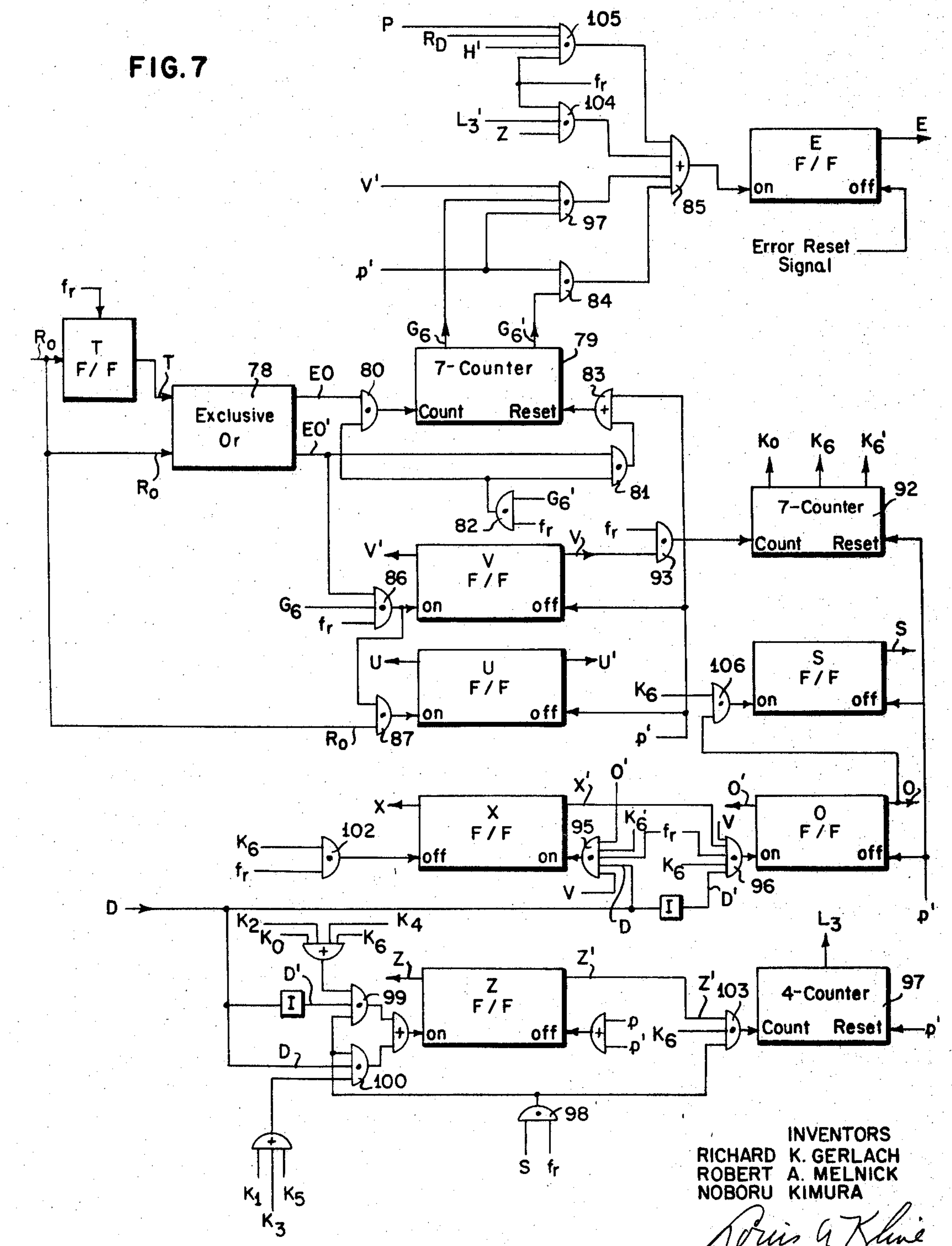

In order to permit the system to determine whether a proper preamble is present following locking in of the AGC circuit (when $R_D'$ becomes true), seven consecutive "1"–"0" preamble alternations are counted. This is accomplished as illustrated in FIG. 7 using a T flip-flop which receives the output of the $R_o$ flip-flop, and thus will contain the same data as the $R_o$ flip-flop but delayed one clock period therefrom. An Exclusive Or circuit 78 receives both of the flip-flop outputs $R_o$ and T for comparison of the adjacent binary signals represented thereby. The unprimed and primed Exclusive Or outputs E0 and E0', after logical combination by AND gates 80, 81 and 82 and OR gate 83, are fed to a 7-counter 79 so that the 7-counter 79 counts when $R_o$ and T are different, and resets when $R_o$ and T are the same. Thus, only when seven uninterrupted consecutive "1"–"0" alternations are read from the card will E0 be true for seven consecutive clock periods to cause the 7-counter 79 to reach its seventh count $G_6$, the occurrence of which indicates that the preamble has been properly detected. If the 7-counter 79 does not reach count $G_6$ by the time that the trailing edge signal $p'$ occurs, (as could happen in the case of an unrecorded track) then, as illustrated in FIG. 7, an E flip-flop is switched "on" via AND gate 84 and OR gate 85 to cause output signal E to become true to advise the data processor that an error has occurred. After responding to the error, the data processor can turn "off" the E flip-flop by, for example, the application thereto of an error reset signal.

Assuming that seven uninterrupted consecutive "1"–"0" preamble alternations are properly counted so that $G_6$ is true, the reading operation then awaits reading of the sync bits, the detection of which is accomplished as illustrated in FIGS. 7 and 8 by turning "on" a V flip-flop via AND gate 86 in response to the Exclusive Or primed output E0' (which is true only when $R_o$ and T are the same) first becoming true following the 7-counter 79 reaching count $G_6$.

It will be understood that because of possible read winding or write winding polarity differences from unit to unit, the sync bits, which by design of the write logic are defined and written as a pair of "1's," may be read as either two "1's" or two "0's." To take care of this possibility, a U flip-flop is provided in FIG. 7 which is turned "on" simultaneously with the V flip-flop, via AND gate 87, if the sync bits are read as "1's," as will be the case if the $R_o$ signal is true at that time, which is the situation illustrated in FIG. 6. By thus enabling either AND gate 88 or 89 in FIG. 6 in accordance with the state of the U flip-flop, the proper phase for the data D read following the sync bits is conveniently provided, regardless of the polarity of the read head. If for some reason the sync bits are not detected after successful detection of the preamble, then signal V′ will be true when trailing edge signal $p'$ occurs so as to turn "on" the E flip-flop in FIG. 7 via AND gate 97*a*.

As a result of the V flip-flop turning "on" in response to the detection of the sync bits, AND gate 90 in FIG. 6 is enabled to cause the data D from the read flip-flop $R_0$ (either $R_0$ or $R_0'$ depending upon whether U or U′ is true) to be serially fed into a data output register 91 in response to read clocks $f_r$ applied to its "in" control line. Data is fed out in parallel by character from the data output register in response to signals $e_0$ applied to its "out" control line from a data processor or other external source.

The seven bits making up each character are counted by a 7-counter 92 by read clocks $f_r$ applied to its count input via AND gate 93, which is enabled by signal V. The $K_6$ count of 7-counter 92 is fed along with signal V to AND gate 101 in FIG. 6 to produce a ready to output data signal $j$ to advise the processor (or other external source) that the data output register 91 will contain the full character on the next count, in response to which the processor can then send an appropriate $e_0$ signal to transfer out the character from the data output register 91 on the next count.

The end of data is recognized by detecting the all "0" character which is then followed by the sum check character, as illustrated in FIGS. 1 and 8. This is accomplished using the X and O flip-flops in FIG. 7 which are both initially "off." When signal V enables AND gate 95 (O′ being initially true), the "on" input of the X flip-flop will sample the data character bits D from the output of AND gate 90 in FIG. 6. It will be understood from the input logic associated with the X and O flip-flops that the X flip-flop will still be "off" during count $K_6$ of a detected character only if the first six bits of the character are all "0's"; then, if the seventh and last bit of the character is also a "0" (which can only properly occur for the all "0" character, since all proper data characters have at least one "1" bit because of the use of odd parity), the O flip-flop will be triggered "on" via AND gate 96 to indicate that the all "0" character has been detected, as shown in FIG. 8. On the other hand, if at least one of the first six bits of a character is a "1," the X flip-flop will be "on" at count $K_6$ so as to prevent turning "on" of the O flip-flop; also, if the first six bits of a character are "0's," but the seventh bit of a character is a "1," then signal D′ will be false to prevent turning "on" the O flip-flop. Thus, the O flip-flop is turned "on" at count $K_6$ only if an all "0" character is detected; otherwise, the O flip-flop remains off and the X flip-flop is turned "off" again via AND gate 102 to sample the next character.

When the O flip-flop is turned "on" in response to detection of the all "0" character, the signal O advises the processor that the next character following is the sum check character, as illustrated in FIGS. 1 and 8. However, as pointed out in the general description, it is possible that a data character which properly should have at least one "1" is improperly read as an all "0" character, causing the O flip-flop to turn "on." In order to prevent such an improperly detected all "0" data character from being recognized as the all "0" character, the alternating "1"–"0" postamble is detected for four character periods (28 bits) following the sum check character to make sure that the alternating "1"–"0" postamble pattern is properly received during this period. This is accomplished in FIG. 7 using an S flip-flop, a Z flip-flop and a 4-counter 97, as will now be described.

At the next count $K_6$ occurring after signal O becomes true as a result of the detection of the all "0" character, flip-flop S is turned "on" via AND gate 106, causing AND gate 98 to be enabled to in turn enable AND gates 99 and 100. As a result, Signal D′ is applied to the "on" input of the Z flip-flop via AND gate 99 during even counts $K_0$, $K_2$, $K_4$, and $K_6$, and signal D is applied to the "on" input of the Z flip-flop via AND gate 100 during odd counts $K_1$, $K_3$, and $K_5$. Since the alternating "1"–"0" postamble begins with a "1," signal D′ will be a "0" during each even count, and signal D will be a "0" during each odd count. Thus, as long as the "1"–"0" postamble pattern properly occurs, the Z flip-flop will remain in the "off" state to which it was set by the leading edge signal $p$. The state of the Z flip-flop at count $K_6$ is sampled via AND gate 103 by the 4-counter 97 which counts each time the Z flip-flop is found to be "off" at count $K_6$. When the 4-counter 97 reaches its fourth count $L_3$, count signal $L_3$ becomes true to advise the data processor that the "1"–"0" alternating preamble was successfully detected for four consecutive characters (28 bits) following the sum check character, in which case the processor can consider the detected all "0" character as proper and, after receiving the sum check character next following, can proceed to act on the received data. It is important to note that with proper characters having odd parity, it is impossible to have two characters in a row without having a double "1" or a double "0." Thus, the detection of an uninterrupted consecutive string of 28 "1"–"0" alternations assures that the end of data character was properly detected.

If a proper "1"–"0" postamble is not received for four consecutive characters, the Z flip-flop will turn "on" to prevent the 4-counter from reaching count $L_3$, and the error flip-flop will be turned "on" via AND gate 104 to indicate an error.

An additional way of detecting an error during reading is by observing the output of the threshold detector 70 in FIG. 6 from the time the preamble is successfully detected ($G_6$ becomes true) until the postamble is successfully detected ($L_3$ becomes true). If during this period the threshold detector 70 ever becomes false, indicating that the signal amplitude has fallen below the threshold (either the read threshold or write threshold, as the case may be), then the E flip-flop in FIG. 7 is turned on via AND gate 105 to indicate an error.

When the trailing edge signal $p'$ then appears, the P, V, U and Z flip-flops are turned "off" (if "on") and the counters reset terminating the read operation.

While this description has been primarily concerned with a particular mechanization for accomplishing the features of this invention, it is to be understood that many modifications in construction and arrangement are possible without departing from the scope of this invention, especially in regard to the specific logical circuitry employed. The present invention, therefore, is to be considered as including all possible modifications and variations coming within the scope of the invention as defined in the appended claims.

What is claimed is:

1. In a magnetic recording and reproducing system, writing means to which a magnetic record member is disposed relative thereto for writing binary digital signals in a track thereof, means coupled to said writing means for causing an alternating "1"–"0" preamble to be written in a first portion of said track, means coupled to said writing means for causing a plurality of like binary bits to be written in said track following said preamble, means coupled to said writing means and responsive to the input data to be recorded for causing said input data to be written in said track following said like binary bits, means coupled to said writing means for causing an end of data character to be written following said input data, and means coupled to said writing means for causing an alternation "1"–"0" postamble to be written in said track following said end of data character.

2. In a magnetic card recording and reproducing system, a source of binary input data signals in the form of multi-bit characters, at least one magnetic write head, at least one magnetic card, means for causing said magnetic card to traverse said write head for recording binary digital data in at least one track thereof, means coupled to said write head and responsive to detection of said card in the vicinity of said write head for causing an alternating "1"–"0" preamble to be written in the first portion of said track which traverses said write head, means coupled to said write head for causing a plurality of like binary bits to be written in said track following said preamble, means responsive to data signals from said source for causing said data signals to be written in said track following said like binary bits, means coupled to said write head for causing an end of data character to be written in said track following said input data, said end of data character being different from said data characters, means coupled to said write head for causing a check character to be written following said end of data character, and means coupled to said write head for causing an alternating "1"–"0" postamble to be written in said track following said check character.

3. In a magnetic recording and reproducing system, a source of binary input data signals in the form of multi-bit characters, alternating signal means for generating on alternating binary signal, a write head, conversion means associated with said write head for converting binary signals applied thereto into a self-clocking binary recording signal for feeding to said write head, a magnetic record member, means for causing said magnetic record member to traverse said write head for recording a self-clocking binary digital data representation in at least one track thereof, means responsive to the detection of a predetermined portion of said record member in the vicinity of said write head for coupling the output of said alternating signal means to said conversion means for causing an alternating "1"–"0" preamble to be written in the first portion of said track which traverses said write head, delay means responsive to detection of said portion of the record member for decoupling the output of said alternating signal means from said conversion means a predetermined time after detection of said portion of the record member so as to terminate the writing of said "1"–"0" preamble in said track, sync bit recording means responsive to the terminating of said preamble by said delay means for applying a plurality of like binary signals to said conversion means to cause recording of two like binary signals on said track following said preamble, means responsive to recording of said like binary signals for coupling said source to said conversion means so as to cause said binary input data signals to be recorded in said track following said two like binary signals, means for causing an end of data character to be recorded in said track following said input data, said end of data character being different from said data characters, means responsive to said input data for generating a check character and for applying said check character to said conversion means for recording thereof in said track following said end of data character, and means for coupling the output of said alternating signal means to said conversion means following recording of said check character so as to cause an alternation "1"–"0" postamble to be recorded in said track following said check character.

4. In a magnetic recording and reproducing system, a magnetic record member having a recording track thereon in which is recorded binary input data in the form of multi-bit characters such that all data characters include at least one bit having one binary value, a plurality of like binary bits recorded in said track preceding said binary input data, an alternating "1"–"0" preamble recorded in said track preceding said like binary bits, an end of data character consisting of bits all having the other binary value recorded in said track following said input data so that said end of data character is different from said data characters, a check character recorded in said track following said end of data character, and an alternating "1"–"0" postamble recorded in said track following said check character.

5. In a magnetic recording and reproducing system, a magnetic record member, means for recording binary digital data in a track of said record member so that the data is preceded by a repetitive preamble, magnetic reading means, electronic circuit means coupled to said magnetic reading means for detecting binary signals recorded in said track, and means for causing said record member to traverse said magnetic reading means so that said preamble traverses said reading means before said data, said electronic circuit means including a lockable automatic gain control means responsive to said preamble and lock-in means cooperating with said gain control means for locking in said automatic gain control means during said preamble at a gain dependent upon the detected preamble signal amplitude.

6. In a magnetic card recording and reproducing system, means for recording self-clocked binary digital data in a track of a card so that the data recorded in said track is preceded by an alternating "1"–"0" preamble, magnetic reading means, electronic circuit means coupled to said reading means for detecting binary digital signals recorded in said track, said electronic circuit means including a lockable automatic gain control circuit responsive to said preamble, and means operative a predetermined period after detection of said card in the vicnity of said reading means and prior to said data reaching said reading means for locking in said automatic gain control circuit at a gain dependent upon the detected preamble signal amplitude.

7. The invention in accordance with claim 5, wherein said automatic gain control means comprises: an element having a non-linear voltage vs. current characteristic and connected in said gain control means so that the magnitude of the output signal therefrom is dependent upon the operating point of said element, circuit means for providing a control signal to said element to control the operating point thereof, said circuit means including a capacitor, charging means for charging said capacitor in response to the difference between said output signal and a reference value, and means responsive to the voltage on said capacitor for providing said control signal.

8. In a magnetic card recording and reproducing system, means for recording binary digital data in a track of a card so that the recorded data in said track is preceded by at least a predetermined number of consecutive "1"–"0" alternations in a preamble, magnetic reading means, means for causing a card to traverse said reading means so that said preamble traverses said reading means before said data, and electronic circuit means coupled to said reading means for detecting binary signals recorded in said track, said electronic circuit means including counter means for determining when a predetermined number of consecutive "1"–"0" alternations occur during reading of said preamble to produce an output signal, and means coupled to said counter means and responsive to said output signal for enabling said electronic circuit means to detect said recorded data.

9. In a magnetic recording and reproducing system, means for recording self-clocked binary digital data in a track of a magnetic record medium so that the recorded data in said track is preceded by at least a predetermined number of "1"–"0" alternations in a preamble and followed by at least one binary bit to provide a plurality of like binary bits, magnetic reading means, means foı causing said record medium to traverse said reading means so that said preamble traverses said reading mean before said data, and electronic circuit means coupled tc said reading means for detecting binary signals recordec in said track, said electronic circuit means including clock generation means for deriving clock pulses fron the detected binary signals and means coupled to sai clock generation means for synchronizing said clocl pulses during said preamble and means for inverting o not inverting the binary signals detected after said plu rality of like binary bits depending upon whether the like binary bits are detected as 0—0 or 1—1.

10. In a magnetic recording and reproducing system, a magnetic record member, means for recording binary digital data in a track of said record member so that the recorded data in said track is preceded by an alternating "1"–"0" preamble and two like binary bits, magnetic reading means, means for causing said record member to traverse said reading means so that said preamble and said like binary bits traverse said reading means before said data, detection means coupled to said reading means for detecting binary signals recorded in said track, means coupled to said detection means for detecting when a predetermined number of consecutive "1"–"0" alternations occur during reading of said preamble, means coupled to said detection means for detecting said like binary bits following detection of said predetermined number of consecutive "1"–"0" alternations, means for inverting or not inverting the output of said detection means in response to the binary value of the detected like binary bits, and fourth circuit means activated in response to the detection of said like binary bits for receiving the detected recorded data following thereafter.

11. In a magnetic recording and reproducing system, a magnetic record member, means for recording binary digital data in a track of said record member so that the data recorded in said track is followed by an end of data character constituted of like binary bits and a postamble, said data being in the form of multi-bit characters different from said end of data character, magnetic reading means, means for causing said record member to traverse said reading means so that said data precedes said end of data character and said postamble, detection means coupled to said reading means for detecting the binary signals recorded in said track, means coupled to said detection means for sampling each data character to determine whether it is said end of data character, and means operative following detection of said end of data character for determining the correctness of the end of data character detected by sampling binary signals following thereafter to determine whether they correspond to said postamble.

12. The invention in accordance with claim 11, wherein said postamble consists of alternating "1"–"0" binary signals, and wherein said last mentioned means determines the presence of said postamble by detecting whether a predetermined number of "1"–"0" alternations are present following said end of data character.

13. In a magnetic recording and reproducing system, a magnetic record member, means for recording binary digital data in a track of said record member so that the data recorded in said track is followed by an end of data character constituted of like binary bits followed by a check character and then an alternating "1"–"0" postamble, said data being in the form of multi-bit characters different from said end of data character, magnetic reading means, means for causing said record member to traverse said reading means so that said data precedes said end of data character, detection means coupled to said reading means for detecting the binary signals recorded in said track, means coupled to said detection means for sampling each data character to determine whether it is said end of data character, and means responsive to detection of an end of data character for determining the correctness thereof by sampling the detected binary signals following one character after detection of said end of data character to determine whether a predetermined number of consecutive "1"–"0" alternations are detected.

14. The invention in accordance with claim 13, wherein each of said multi-bit data characters includes seven bits of which one bit is chosen to provide odd parity, wherein said end of data character is comprised of seven "0" bits, and wherein said last mentioned means is constructed and arranged to sample at least two character periods of the detected binary sigals following one character after detection of said end of data character.

15. In a magnetic recording and reproducing system, a magnetic record member, means for recording multi-bit binary digital data in a track of said record member so that the data recorded in said track is preceded by an alternating "1"–"0" preamble and sync bits and is followed by an end of data character different from any data character and an alternating "1"–"0" postamble, magnetic reading means, means for causing said record member to traverse said reading means so that said preamble is read first, detection means coupled to said reading means for detecting binary signals recorded in said track, means coupled to said detection means for determining when a predetermined number of consecutive "1"–"0" alternations occur during reading of said preamble, means coupled to said detection means for detecting said sync bits following detection of said predetermined number of consecutive "1"–"0" alternations, means operative following detection of said sync bits for receiving the detected recorded data following thereafter, means coupled to said detection means for sampling each data character to determine whether it is said end of data character, and means operative following detection of said end of data character for determining the correctness thereof by sampling binary signals following thereafter to determine whether they correspond to said postamble.

16. In a magnetic recording and reproducing system, a magnetic record member, means for recording multi-bit binary digital data in a track of said record member so that the data recorded in said track is preceded by an alternating "1"–"0" preamble and sync bits and its followed by an end of data character different from any data character and an alternating "1"–"0" postamble, magnetic reading means, means for causing said record member to traverse said reading means so that said preamble is read first, detection means coupled to said reading means for detecting binary signals recorded in said track, said detection means including a lockable automatic gain control means responsive to said preamble which is locked in during said preamble at a predetermined gain dependent upon the detected preamble signal amplitude, means coupled to said detection means and operative after said automatic gain control means is locked in for determining when a predetermined number of consecutive "1"–"0" alternations, occur during reading of said preamble, means coupled to said detection means for detecting said sync bits following detection of said predetermined number of consecutive "1"–"0" alternations, means operative following detection of said sync bits for receiving the detected recorded data following thereafter, means coupled to said detection means for sampling each data character to determined whether it is said end of data character, and means operative following detection of said end of data character for determining the correctness thereof by sampling binary signals following thereafter to determine whether they correspond to said postamble.

17. In a magnetic recording and reproducing system, a read and a write head, means for causing a magnetic record member to traverse said write and read heads in that order, means coupled to said write head for writing binary digital data on said record member, detection means coupled to said read head for reading binary digital data recorded on said record member, and threshold means cooperating with said detection means for automatically providing a first predetermined threshold level for the detected signal when only reading of said record member is occurring and a second predetermined threshold level when simultaneous reading and writing are occurring.

18. The invention in accordance with claim 17, wherein means are additionally provided coupled to said threshold means for providing a signal indication when the detected signal level falls below the threshold provided by said threshold means.

19. In a magnetic recording and reproducing system, a magnetic record member, means for recording binary digital data in a track of said record member so that the recorded data in said track is preceded by an alternating "1"–"0" preamble, magnetic reading means, means for causing said record member to traverse said reading means so that said preamble traverses said reading means before said data, and electronic circuit means coupled to said reading means for detecting binary signals recorded in said track, said electronic circuit means including means for determining when a predetermined number of consecutive "1"–"0" alternations occur during reading of said preamble, said electronic circuit means also including threshold means for automatically providing a first predetermined threshold level for the detected signal when only reading is occurring and a second predetermined threshold level when simultaneous reading and recording are occurring.

References Cited

UNITED STATES PATENTS

| | | | |
|---|---|---|---|
| 2,972,735 | 2/1961 | Fuller et al. | 340—174.1 |
| 2,813,259 | 11/1957 | Burkhart | 340—174.1 |

STANLEY M. URYNOWICZ, *Primary Examiner.*

A. J. NEUSTADT, *Assistant Examiner.*

U.S. Cl. X.R.

179—100.2; 346—74